UNITED STATES PATENT OFFICE.

ARTHUR ROWLAND GOODWIN, OF BOSCOMBE, KIDDERMINSTER, ENGLAND.

TREATMENT OF SEMOLINA.

1,368,792.  Specification of Letters Patent.  Patented Feb. 15, 1921.

No Drawing.  Application filed October 30, 1918.  Serial No. 260,221.

*To all whom it may concern:*

Be it known that I, ARTHUR ROWLAND GOODWIN, a subject of the King of Great Britain, residing at Boscombe, Kidderminster, England, have invented a new and useful Improvement in the Treatment of Semolina, of which the following is a specification.

This invention relates to the treatment of wheaten semolina, and has for its object to produce food products especially suitable for use in making puddings, blanc-manges and soups.

According to this invention, wheaten semolina is submitted to the action of steam until it becomes very slightly glutinous, care being taken that its granular nature is not destroyed and that the grains do not coalesce. The best results are obtained when the semolina is treated with dry steam for about eight minutes using 40 pounds pressure of steam. Flavoring essences in powder form, such as chocolate, fruit essences, dried eggs in powdered form, egg powder, or meat or vegetable extracts in powdered form, are then added to the steamed semolina. The mixture is then shaken together until each grain is coated, and dried preferably by passing hot air through it, and may then be sieved to separate the grains from any loose powder.

The coating substances may be in paste or liquid form, in which case the mixture is shaken together until each grain is coated and is then again submitted to the action of steam for a short period, after which it is dried at a temperature of 100° to 150° Fahr., preferably by passing hot air through it. In order to break up and remove any grains that have coalesced and formed lumps, the mixture may be passed through a detacher and afterward sieved.

If desired coloring matter may also be mixed with the semolina together with the essences or other substances.

What I claim is:—

1. The herein described process which consists in treating wheaten semolina with steam until it becomes very slightly glutinous and then coating the grains of the steamed semolina.

2. Treating wheaten semolina with steam until it becomes very slightly glutinous without destroying its granular nature and without producing coalescence and then coating the individual grains thus treated.

3. Treating wheaten semolina with steam until it becomes very slightly glutinous without destroying its granular nature and without producing coalescence, and then coating the individual grains thus treated with flavoring essence.

4. Treating wheaten semolina with steam until it becomes very slightly glutinous without destroying its granular nature and without producing coalescence, then adding a coating material to the grains thus treated and then drying the mixture.

In testimony that I claim the foregoing as my invention I have signed my name this 5th day of October 1918.

ARTHUR ROWLAND GOODWIN.